Patented Sept. 20, 1932

1,877,847

UNITED STATES PATENT OFFICE

WILFRID GIBSON AND JOSEPH BARON PAYMAN, OF BLACKLEY, MANCHESTER, ENGLAND, ASSIGNORS TO IMPERIAL CHEMICAL INDUSTRIES LIMITED, OF LONDON, ENGLAND

MANUFACTURE OF ESTERS

No Drawing. Application filed December 11, 1928, Serial No. 325,386, and in Great Britain December 21, 1927.

This invention relates to the preparation of esters, particularly esters of formic and acetic acids, and especially the formates and acetates of aliphatic alcohols containing three, four and five carbon atoms and of polyhydric alcohols, such as ethylene glycol and glycerol, and of alicyclic alcohols such as cyclohexanol.

It is well known that organic acid amides react with alcohols in the presence of mineral acid to give esters of the organic acid and the ammonium salt of the mineral acid.

We have now discovered that the reaction between organic acid amides and alcohols proceeds smoothly in the presence of zinc chloride and other metal salts such as zinc sulphate, mercuric chloride, etc. as catalysts, the products being ammonia and the ester of the organic acid. We have further found that zinc-ammino-chloride also catalyzes the reaction and may be used to replace all or part of the zinc chloride.

It will be observed that in our process ammonia is liberated and may be recovered either in gaseous form or by absorption in water or acid. The gaseous ammonia may be utilized for the manufacture of formamide by reaction with carbon monoxide in known manner, and our invention thus provides in effect a new method for the formylation of alcohols by carbon monoxide:

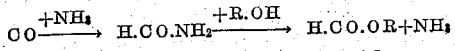

Similarly, our invention provides a new route for the acetylation of alcohols by ketene:

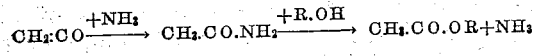

We may use in our process any mono- or polyhydric alcohol, but we have obtained the best results by using n- propyl alcohol, n-, iso- and tert.-butyl alcohols, amyl alcohols, ethylene glycol and its monoalkyl ethers, propylene glycol and its monoalkyl ethers and cyclohexanols. The alcohols should preferably be substantially anhydrous. If desired a solvent or diluent may be added.

Any acid amide may be employed, but the most useful results have been obtained from formamide and acetamide.

In many cases it is observed that the formic ester, which by our process is produced in very pure condition, boils at a lower temperature than the alcohol from which it is made. Where this is so, it is possible to arrange a reflux condensing column above the reaction vessel and allow ester vapours to pass away to collecting vessels, whilst unchanged alcohol is returned to the reaction vessel. This has the advantage not only of preventing the reverse reaction:

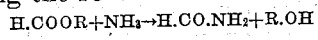

and thus accelerating completion of the esterification, but also, in some cases, of preventing the precipitation of the catalyst (which may be soluble in the alcohol-amide mixture, but may become insoluble as ester takes the place of alcohol).

Our process is obviously capable of wide application, and the examples given below are intended to be illustrative and in no sense limitative as to the reagents of the conditions and method of working. Thus, although with butyl alcohol and formamide simple boiling at atmospheric pressure is satisfactory, in other cases increased or reduced pressures may be desirable. Other inorganic metal salts may be used in place of zinc chloride as catalyst.

Our invention is illustrated but not limited by the following examples in which the parts are by weight.

*Example 1.*—74 parts of n-butyl alcohol are mixed with 45 parts of formamide, and 3 parts of zinc chloride are added. The whole is boiled under a reflux condenser until no more ammonia gas is evolved. The ammonia can be conveniently absorbed in cold water. When the reaction is completed, after about 48 hours, the product, butyl formate, is made slightly acid with 10 per cent HCl solution, and the acid layer is separated. The ester layer is shaken with 100 parts of water, and the wet ester is drawn off and dried over fused calcium chloride.

The yield of dried ester is about 90 parts. Of this, about 86 parts (84 per cent of theory) distil between 103° and 107° C. In addition, at least 12.9 gms. of ammonia, or 76 per cent of theory, are recovered in the form of an aqueous solution.

Any unused butyl alcohol is obtained in the aqueous extract resulting from the water washing of the ether and can be recovered by rectification of this aqueous extract. This butyl alcohol can be used over again.

*Example 2.*—88 parts of isoamyl alcohol are mixed with 59 parts of acetamide together with 2 parts of zinc chloride. The mixture is boiled under reflux until no more ammonia gas is evolved. At least 14 gms. of ammonia are thus obtained, conveniently in the form of an aqueous solution.

When the reaction is complete, the product is acidified with dilute HCl solution, and the acid layer is run off. The ester layer is washed with 100 parts of water, and the separated wet ester is dried over fused calcium chloride.

The dried ester is then purified by fractional distillation. The yield of isoamylacetate is approximately 86 per cent of theory.

*Example 3.*—93 parts of ethylene glycol are heated with 90 parts of acetamide and 3 parts of zinc chloride, in an apparatus so arranged that refluxion takes place at about 200 mm. pressure. When the evolution of ammonia is complete, the residual product is directly distilled under a fractionating column and as much as 146 gms. (or 83 per cent of theory) of ethylene glycol monoacetate can be collected between 180° C. and 184° C.

*Example 4.*—(Use of catalysts other than zinc chloride.)

74 parts of butyl alcohol are refluxed with 45 parts of formamide and 2 parts of mercuric chloride until no further ammonia is evolved. The residual product is worked up as in Example 3 and good yields of butyl formate are obtained.

*Example 5.*—74 parts of butyl alcohol are refluxed with 45 parts of formamide and 2 parts of zinc sulphate until no further ammonia is evolved. The residual product is worked up as in Example 3, good yields of butyl formate being obtained.

*Example 6.*—(Cyclohexanol; reduced pressure).

100 parts of cyclohexanol together with 45 parts of formamide and 2 parts of zinc chloride are gently refluxed together under a reduced pressure of about 200 mm. until ammonia gas is no longer evolved. The residual product is then fractionally distilled. There is recovered about 115 gms. of cyclohexyl formate distilling between 160 and 166° C. This corresponds to about 90 per cent of the theoretical yield.

What we claim and desire to secure by Letters Patent is:—

1. A process for the manufacture of esters of aliphatic acids which comprises heating together an aliphatic acid amide, an alcohol and an inorganic catalytic salt of a metal selected from a class consisting of zinc chloride, zinc sulphate, zinc-ammino-chloride and mercuric chloride.

2. A process for the manufacture of esters of aliphatic acids which comprises heating together an aliphatic acid amide, an alcohol and an inorganic catalytic salt of a metal selected from a class consisting of zinc chloride, zinc sulphate, zinc-ammino-chloride and mercuric chloride in the presence of a solvent and at a reduced pressure.

3. A process for the manufacture of esters of aliphatic acids which comprises heating together an aliphatic acid amide, an alcohol and an inorganic catalytic salt selected from a class consisting of zinc chloride, zinc sulphate, zinc-ammino-chloride and mercuric chloride, the ammonia liberated by the reaction being recovered.

4. A process for the manufacture of esters of aliphatic acids which comprises heating together an aliphatic acid amide, an alcohol, and an inorganic catalytic salt of a metal selected from a class consisting of zinc chloride, zinc sulphate, zinc-ammino-chloride and mercuric chloride, the ammonia liberated by the reaction being recovered in available form by conversion into an aliphatic acid amide.

5. A process for the manufacture of formic esters which comprises heating together formamide, an alcohol, and an inorganic catalytic salt of a metal selected from a class consisting of zinc chloride, zinc sulphate, zinc-ammino-chloride and mercuric chloride.

6. A process for the manufacture of formic esters which comprises heating together formamide, an alcohol, and zinc chloride.

7. A process for the manufacture of low-boiling alkyl formates which comprises heating together formamide, an aliphatic alcohol capable of giving a formate boiling at a lower temperature than the alcohol, and an inorganic catalytic salt of a metal selected from a class consisting of zinc chloride, zinc sulphate, zinc-ammino-chloride and mercuric chloride, condensing the unreacted alcohol vapors and returning them to the reaction mixture and allowing the alkyl formate to pass forward as vapor for subsequent condensation and collection.

8. In the manufacture of esters of aliphatic acids, the process which comprises reacting together an aliphatic acid amide and an alcohol in the presence of an inorganic catalytic salt of a metal selected from a class consisting of zinc chloride, zinc sulphate, zinc-ammino-chloride and mercuric chloride to form an ester and ammonia, converting the ammonia into an aliphatic acid amide and reintroducing said amide into the process.

9. In the manufacture of esters of aliphatic acids the process which comprises reacting together an aliphatic acid amide and an alcohol in the presence of an inorganic catalytic salt of a metal selected from a class consisting of zinc chloride, zinc sulphate, zinc-ammino-chloride and mercuric chloride, to form an ester and ammonia, recovering the unconverted alcohol and ammonia, converting said ammonia into an aliphatic acid amide and reintroducing said aliphatic acid amide and uncoverted alcohol into the process.

10. In the manufacture of formic esters from alcohols, the process which comprises reacting together carbon monoxide and ammonia in the presence of an inorganic catalytic salt of a metal selected from a class consisting of zinc chloride, zinc sulphate, zinc-ammino-chloride and mercuric chloride to form formamide, reacting said formamide with an alcohol to form an ester and ammonia, recovering the ammonia and reintroducing it into the process.

11. In the manufacture of esters from alcohols, the process which comprises reacting with ammonia upon a compound selected from a group consisting of carbon monoxide and ketene to form an amide, reacting said amide with an alcohol in the presence of an inorganic catalytic salt selected from a class consisting of zinc chloride, zinc sulphate, zinc-ammino-chloride and mercuric chloride, to form an ester and ammonia and reintroducing said ammonia in the first step of the process.

In testimony whereof we affix our signatures.

WILFRID GIBSON.
JOSEPH BARON PAYMAN.